US008898500B2

(12) United States Patent
Araki et al.

(10) Patent No.: US 8,898,500 B2
(45) Date of Patent: Nov. 25, 2014

(54) METHOD AND APPARATUS FOR PERFORMING ENERGY MANAGEMENT VIA A SUB-SYSTEM (75) Inventors: Shunsuke Araki, Kanagawa-ken (JP); Takashi Nakayama, Tokyo (JP); Toshiaki Takano, Kanagawa-ken (JP)

(73) Assignee: Nokia Corporation, Espoo (FI)

( * ) Notice: Subject to any disclaimer, the term of this patent is extended or adjusted under 35 U.S.C. 154(b) by 443 days.

(21) Appl. No.: 12/975,875

(22) Filed: Dec. 22, 2010

(65) Prior Publication Data
US 2012/0005509 A1    Jan. 5, 2012

Related U.S. Application Data (60) Provisional application No. 61/289,139, filed on Dec. 22, 2009.

(51) Int. Cl.
G06F 1/32 (2006.01)
(52) U.S. Cl.
CPC ............ *G06F 1/3203* (2013.01); *G06F 1/3293* (2013.01); *G06F 1/3287* (2013.01); *Y02B 60/1282* (2013.01); *Y02B 60/1278* (2013.01); *Y02B 60/121* (2013.01)
USPC ............................ 713/324; 713/320; 713/323
(58) Field of Classification Search
None
See application file for complete search history.

(56) References Cited

U.S. PATENT DOCUMENTS

| 5,471,621 | A | 11/1995 | Ohtsuki |
| 5,832,283 | A | 11/1998 | Chou et al. |
| 6,272,645 | B1 * | 8/2001 | Wang ............................. 713/323 |
| 6,445,937 | B1 | 9/2002 | Dasilva |
| 6,771,250 | B1 | 8/2004 | Oh |
| 2003/0135771 | A1 | 7/2003 | Cupps et al. |
| 2004/0155860 | A1 | 8/2004 | Wenstrand et al. |
| 2004/0225901 | A1 * | 11/2004 | Bear et al. ..................... 713/300 |
| 2004/0250147 | A1 | 12/2004 | Chang |
| 2005/0182980 | A1 * | 8/2005 | Sutardja ........................ 713/320 |
| 2007/0230484 | A1 * | 10/2007 | Hu et al. ....................... 370/401 |
| 2007/0277020 | A1 | 11/2007 | Kelley |
| 2009/0164152 | A1 | 6/2009 | Creus et al. |

FOREIGN PATENT DOCUMENTS

| CN | 1519682 A | 8/2004 |
| CN | 1550951 A | 12/2004 |
| EP | 1012725 A1 | 6/2000 |
| JP | H 10261226 A | 9/1998 |
| JP | A-2000/235433 | 8/2000 |

(Continued)

OTHER PUBLICATIONS

International Search Report and Written Opinion, received in corresponding Patent Cooperation Treaty Application No. PCT/IB2010/055999. Dated Apr. 14, 2011. 9 pages.

(Continued)

*Primary Examiner* — Dennis M Butler
(74) *Attorney, Agent, or Firm* — Alston & Bird LLP (57) ABSTRACT Various methods for performing energy management via a sub-system are provided. One example method includes receiving a user input while a main processing system is in a power saving mode and buffering a representation of the user input. The example method further includes, in response to receiving the user input, triggering a wake up of a main processing system from the power saving mode, and causing transmission of the representation of the user input to the main processing system for processing. Similar and related example methods and example apparatuses are also provided.

19 Claims, 5 Drawing Sheets

(56) References Cited

FOREIGN PATENT DOCUMENTS

| WO | WO 91/00566 A1 | 1/1991 |
|----|----------------|--------|
| WO | 97/44737 A | 11/1997 |
| WO | 2008/136551 A1 | 11/2008 |
| WO | 2009124911 A1 | 10/2009 |
| WO | WO-2009/151753 | 12/2009 |

OTHER PUBLICATIONS

Havinga et al., "Low power system design techniques for mobile computers", 1997.

Extended Search Report for European Application No. 10 838 815 dated Jul. 1, 2013.

Japanese Office Action for Application No. 2012-540537, dated Oct. 4, 2013.

Office Action for Korean Application No. 2012-7019238 dated Oct. 15, 2013.

Office Action for Japanese Application No. 2012-540537 dated Dec. 20, 2013.

Office Action for Chinese Application No. 201080056502.6 dated Apr. 16, 2014.

* cited by examiner

METHOD AND APPARATUS FOR PERFORMING ENERGY MANAGEMENT VIA A SUB-SYSTEM

RELATED APPLICATION

This application claims priority to U.S. Application No. 61/289,139 filed Dec. 22, 2009, which is incorporated herein by reference in its entirety.

TECHNICAL FIELD

Embodiments of the present invention relate generally to the functionality of mobile electronic devices, and, more particularly, relate to a method and apparatus for performing energy management via a sub-system.

BACKGROUND

The evolution of mobile electronic devices has, in large part, progressed as a result of the development of increasing processing capabilities in increasing smaller microprocessor form factors. These microprocessors are capable of executing complex applications at rapid speeds. Such applications include for example, web browsing, video recording and playback, video games, and the like.

However, microprocessors having these remarkable processing capabilities, also have requirements to support their operation. One important requirement is supporting the power needs of the microprocessor. While these small form factor microprocessors provide for mobility as a result of their size, the power requirements of the microprocessors tend to limit mobility due to relatively high power consumption. In this regard, mobility is often achieved through the use of a battery as a power source for the microprocessor. Batteries have a finite battery life or battery charge life, and as such, the utilization of this finite resource can be managed to increasingly support long term device mobility.

Users demand that the battery life of an electronic device be within a particular range of time (e.g., twenty-four hours), and user experience is generally improved as battery life is increased. However, users also demand that mobile electronic devices perform increasingly complex functionality that require microprocessors that consume increasing amounts of power. Thus, the management of these competing forces to provide both long battery life while supporting complex functionality is needed to achieve an improved user experience.

BRIEF SUMMARY

Example methods and example apparatuses are described herein that provide for energy management and user interface simplification via a sub-system. In this regard, an electronic device or a system of electronic devices may include a main processing system and a sub-system. The main processing system may consume relative more power than the sub-system when the main processing device and the subsystem are active. The main processing system may be configured to implement a power saving mode. To reactivate the main processing system from the power saving mode, a wake up signal may be provided to the main processing device. According to some example embodiments, when the main processing system is in the power saving mode, the main processing system may not be prepared to receive user input. As such, the sub-system may be configured to receive and buffer user input while the main processing system is in the power saving mode. In this regard, the sub-system may be configured to receive and buffer user input, wake up the main processing system, and forward the user input to the main processing system, when the main processing system is prepared to receive the user input after a wake up. According to various example embodiments, due to the operation of the sub-system, a user may provide user input, even when the main processing system is in the power saving mode, and the user input will be captured by the sub-system. According to some example embodiments, users are able to provide immediate user input with a single action, without having to provide input that first wakes up the main processing system, followed by additional user input for processing.

Various example methods and apparatuses of the present invention are described herein, including example methods for performing energy management via a sub-system. One example method includes receiving a user input while a main processing system is in a power saving mode and buffering a representation of the user input. The example method also includes, in response to receiving the user input, triggering a wake up of a main processing system from the power saving mode, and causing transmission of the representation of the user input to the main processing system for processing.

An additional example embodiment is an apparatus configured to perform energy management via a sub-system. The example apparatus comprises at least one processor and at least one memory including computer program code, the at least one memory and the computer program code configured to, with the at least one processor, cause the apparatus to perform various functionality. The example apparatus may be caused to perform receiving a user input while a main processing system is in a power saving mode, and buffering a representation of the user input. The example apparatus may also be caused to perform, in response to receiving the user input, triggering a wake up of a main processing system from the power saving mode, and causing transmission of the representation of the user input to the main processing system for processing.

Another example embodiment is a computer-readable storage medium having computer program code stored thereon, wherein execution of the computer program code causes an apparatus to perform various functionalities. Execution of the computer program code may cause an apparatus to perform receiving a user input while a main processing system is in a power saving mode and buffering a representation of the user input. Execution of the computer program code may also cause the apparatus to perform, in response to receiving the user input, triggering a wake up of a main processing system from the power saving mode, and causing transmission of the representation of the user input to the main processing system for processing.

Another example apparatus includes means for receiving a user input while a main processing system is in a power saving mode and means for buffering a representation of the user input. The example apparatus may also include means for triggering a wake up of a main processing system from the power saving mode in response to receiving the user input, and means for causing transmission of the representation of the user input to the main processing system for processing in response to receiving the user input.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to various example embodiments of the present invention, techniques for performing power management and/or improving user experience through, for example, a reduction in the user input needed to carry out functionality on an electronic device, such as a mobile electronic device, is provided. In this regard, an electronic device or system may include system level hardware including a main processing system and a sub-system. In some example embodiments, the main processing system and the sub-system may be located in separate electronic devices. The main processing system may include a central processor that supports normal operating functionality of the electronic device. The main processing system may operate in an active mode when, for example, a user is actively interacting with the electronic device. In an active mode, the main processing system may be configured to provide maximum processing speed (or an active threshold speed) to the current activities of the electronic device (e.g., web browsing).

Further, the main processing system may be configured to enter a power saving mode, for example, after a given duration of user inactivity (e.g., no input has been provided by a user via the user interface). According to some example embodiments, when the main processing system is in the power saving mode, the main processing system may be consuming a relative low amount of power (e.g., a low power mode) to maintain, for example, essential functionalities such as system layer functionalities, such as the ability to receive and process a wakeup signal, or application layer functionalities, such as ongoing playback of an audio track. According to some example embodiments, when the main processing system is in the power saving mode, power to the main processing system may be completely interrupted (e.g., a no power mode).

In the power saving mode, according to some example embodiments, the main processing system may completely power down and/or enter a state where main processing system can still respond to particular inputs (e.g., a wake up trigger signal). Further, in some example embodiments, when the main processing system is in the power saving mode, the main processing system may continue to support ongoing functionality, such as playback of an audio file, but other non-essential portions of the main processing system may be powered down (e.g., portions directed to providing signals to drive a display). According to some example embodiments, when the electronic device enters a locked mode, the main processing system may enter the power saving mode, possibly after a period of time.

When the main processing system is in the power saving mode, the main power system may have to first be woken up, before the main power system is prepared to, for example, receive user input. In some instances, a start-up period of time may occur between the time that a wake up signal is provided to a main power system and the time when the main power system is prepared to receive user input. To, for example, avoid a user experienced delay between the initial attempt to provide user input and the time that the main processor system is prepared to receive user input, a sub-system may be utilized.

According to some example embodiments, a sub-system may be active when the main processing system is in the power saving mode. The sub-system may be configured to consume less power when the sub-system is active, than the main processing system consumes when the main processing system is active. Accordingly, a net power savings may be achieved when the sub-system is active and the main processing system is in the power saving mode.

The sub-system, which may be comprised of at least one processor, may be configured to receive user input commands, while the main processing system is in the power saving mode. In this regard, the sub-system, when active, may be prepared to receive and buffer user input in the form of user input commands. According to various example embodiments, user input may be provided via touch panels, buttons, finger recognition sensors, pressure sensors, proximity sensors, and the like. In response to receiving a user input command, the sub-system may be configured to trigger a wake up of the main processing system and, when the main processing system is prepared, transmit the user input command to the main processing system for processing. According to some example embodiments, the main processing system may return to the power saving mode upon processing the user input command. In this regard, according to some example embodiments, an electronic device may remain in a locked mode while the main processing system wakes up, processes the user input command, and returns to the power saving mode.

As described above, the sub-system may be configured to receive user input commands. According to some example embodiments, the sub-system may be configured to receive, buffer, and transmit any type of user input to the main processing system. However, in accordance with some example embodiments, the sub-system may configured to receive buffer, and transmit a particular type of user input, that is, user input commands. A user input command may be detected as a command for the electronic device to do more than simply wake up the main power system. Rather, a user input command may be user input that, based upon the application currently being implemented, causes the main processing system to, for example, skip to the next song on a playlist, perform an email check, open another application, close an application, disconnect from a communications session, or the like.

According to various example embodiments, as a result of implementing the sub-system, a user is able to interact with an electronic device by providing user input, even while a main processing system of the electronic device is in a power saving mode, without experiencing a lag time before the electronic device is prepared to receive user input and without having to provide an initial user input to wake up the electronic device followed by a user input command to request that the electronic device perform a task. As such, according to some example embodiments, a single user input command (e.g., a single swipe on a touch screen display) can be performed by a user to cause the electronic device to both wake up and execute the requested task. With an electronic device that includes a touch screen display, according to various example embodiments, there is therefore no need to tap the screen in an effort to wake up the electronic device, and then provide user input. Rather, according to various example embodiments, through the use of the sub-system, the electronic device is continuously prepared to receive user input, despite the main processing system being in a power saving mode.

Figure 1:
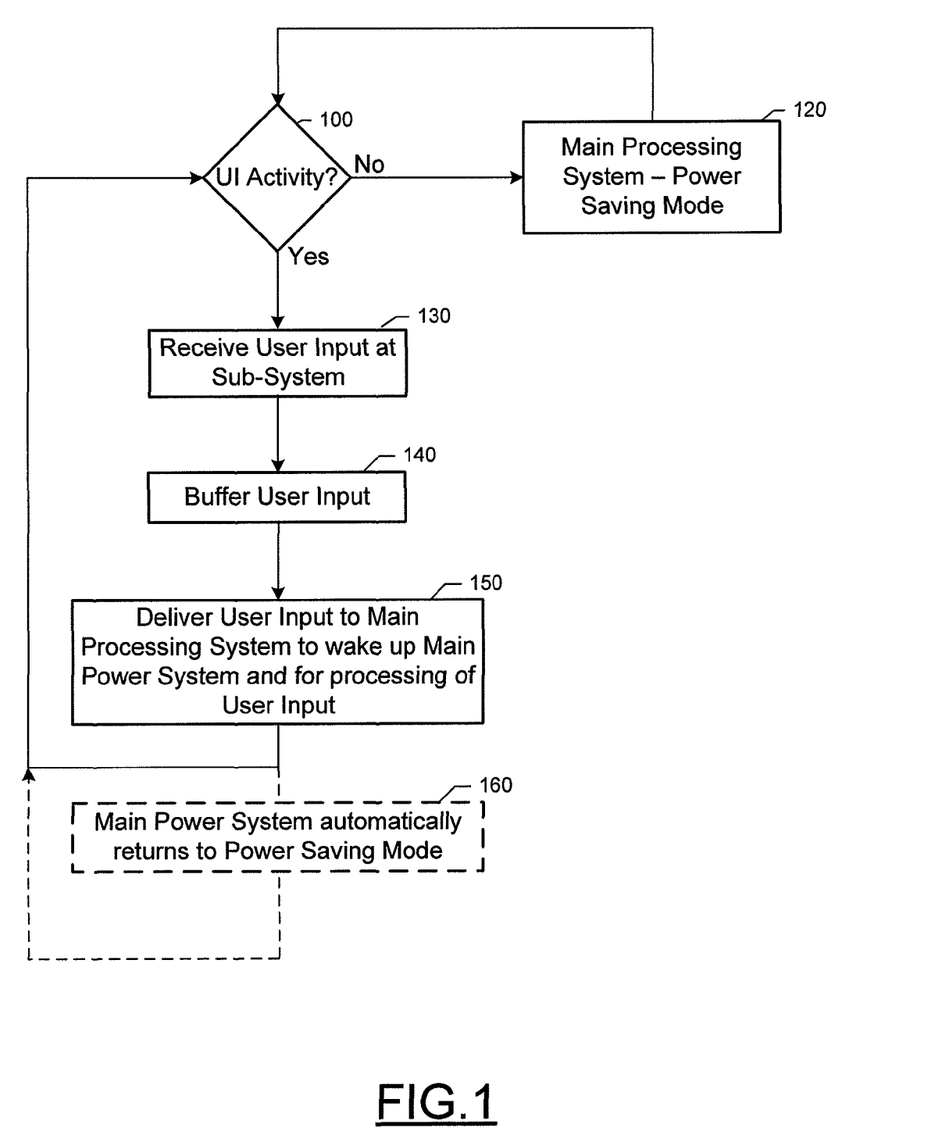
FIG. 1 illustrates a flowchart of an example method for power management of a main processing system according to an example embodiment of the present invention.

FIG. 1 illustrates a flowchart of an example method for performing power management via a sub-system. The example method of FIG. 1 may be implemented by an electronic device or a system of electronic devices that includes a main processing system and a sub-system as described herein. At 100, the electronic device may make a determination as to whether user interface (UI) activity has occurred or been received. If no user interface activity has been received, possibly for a threshold period of time, the main processing system may enter a power saving mode at 120. If user activity has been detected, and the main processing system is in the power saving mode, the user input may be received by the sub-system at 130. According to some example embodiments, if the main processing system is not in a power saving mode, the sub-system may be bypassed and the user input may be received directly from the user interface. However, according to some example embodiments, the sub-system may perform a pass through operation that passes the user input to the main processing system for processing.

As stated above, when the main processing system is in the power saving mode, the sub-system may receive the user input at 130 and store or buffer the user input at 140. The sub-system may use a data storage device that is part of the sub-system to buffer the user input or a data storage device that is, for example, used by the main processing system for data storage. At 150, the sub-system may deliver the user input to the main processing system to wake up the main processing system and for processing the user input. In this regard, according to some example embodiments, the sub-system may first send a wake up communication to the main processing system followed by a representation of the user input, when the main processing system is prepared to receive this information. Alternatively, the sub-system may send a single communication to the main processing system that triggers a main processing system wake up and provides a representation of the user input for the main processing system to process.

In response to processing the user input, the main processing system may optionally return to the power saving mode at 160. As depicted in FIG. 1, according to some example embodiments, the main processing system need not automatically return to the power saving mode, but may rather await further user input. According to various example embodiments, whether or not the main processing system returns to the power saving mode may be application and user input specific. For example, if the user input is a command to skip to the next song in the playlist, the main processing system may return to the power saving mode and continue to play the next song. However, if the user input requests that, for example, a web browser application be opened, the main processing system may remain active after having completed the task of opening the browser.

Based on the foregoing, example use cases are provided. In this regard, according to a first use case, an example embodiment of the present invention may be implemented with a television remote control, where the television remote control is the sub-system and the television is the main processing system. In this regard, the user of the remote control, rather than having to press a power button on the remote control to turn on the television, and then press the "5" button on to change to channel 5, the user may simply press the "5" button on the remote control. By pressing the "5" button the remote control, the remote control may be configured to send a wake up or power on signal to the television, and a signal representing a request to change the tuned channel of the television to channel 5. As such, according to some example embodiments, the user may provide a single user input, while the sub-system triggers a wake up of the main processing system and transmits a representation of the user input for processing by the main processing system.

A second use case involving an example embodiment is described with respect to the operation of a media player device. Unlike the first use case, in accordance with the second use case the main processing system and the sub-system may be included within a single media player device. The media player device may be currently playing a song and the main processing system may be operating in an active mode. Subsequently, the media player device may be locked, either as a result of user input or due to an inactivity timer. Accordingly, the media player device may continue to play music in the locked state and the main processing system (e.g., main processor) may enter a power saving mode while continuing to play the music. The user may subsequently provide user input (e.g., in the form of a stoke gesture on a touch screen display) in the form of a single user action requesting that the next track be played. Despite the main processing system being in the power saving mode, a sub-system may receive and buffer the user input, trigger a wake up of the main processing system, and provide the main processing system with a representation of the user input for processing. The display of the media player device may indicate that the next track has been requested. Subsequent to skipping to the next track, the main processing system may return to the power saving mode.

Figure 2:
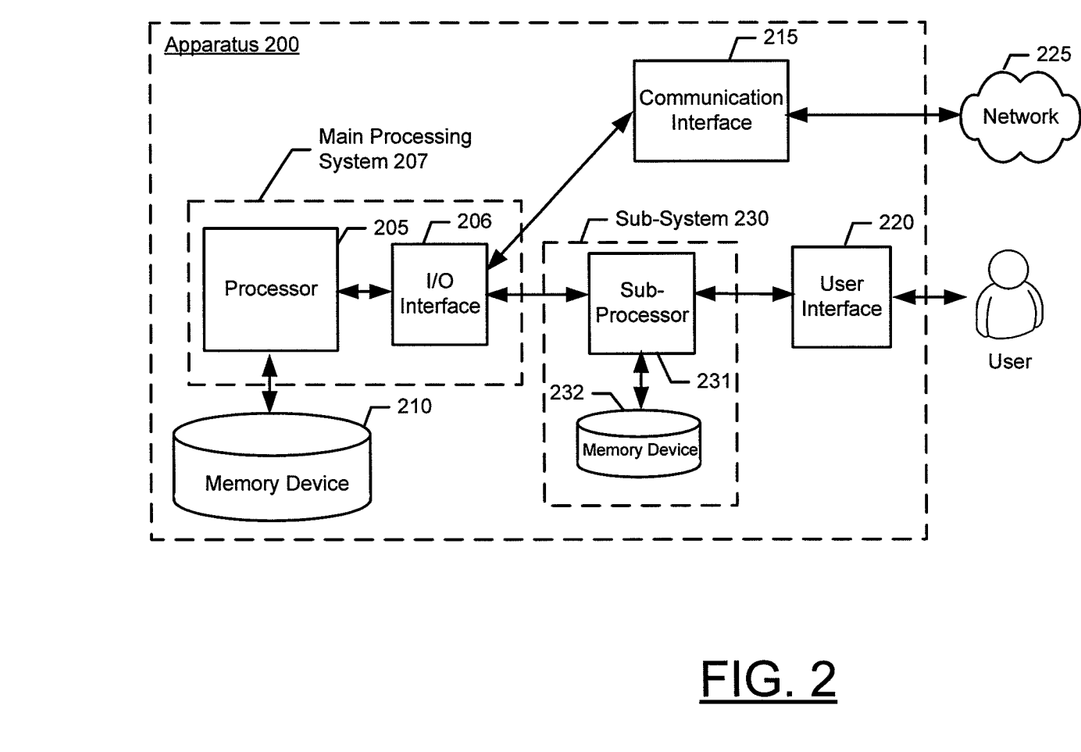
FIG. 2 illustrates a block diagram of an apparatus and associated system for energy management via a subsystem according to an example embodiment of the present invention.

FIG. 2 illustrates an example apparatus 200 configured to perform energy management via a sub-system as described herein. In some example embodiments, the apparatus 200 may, be embodied as, or included as a component of, a communications device with wired or wireless communications capabilities. In some example embodiments, the apparatus 200 may be part of a communications device, such as a stationary or a mobile terminal. As a mobile terminal, the apparatus 200 may be a mobile computer, mobile telephone, a portable digital assistant (PDA), a pager, a mobile television, a gaming device, a camera, a video recorder, an audio/video player, a radio, and/or a global positioning system (GPS) device, television remote control, any combination of the aforementioned, or the like. Regardless of the type of communications device, apparatus 200 may also include computing capabilities.

The example apparatus 200 includes or is otherwise in communication with a processor 205, a memory device 210, an input/output (I/O) interface 206, a communications interface 215, user interface 220, and a sub-system 230. According to various example embodiments, the processor 205 and the I/O interface 206 may be included in a main processing system 207. Further, according to various example embodiments, the sub-processor 231 and the memory device 232 may be included in the sub-system 230. While FIG. 2 depicts processor 205, memory device 210, an input/output (I/O) interface 206, a communications interface 215, user interface 220, and a sub-system 230 as part of a single apparatus 200, it is contemplated that these entities may be grouped in various combinations as part of a plurality of devices.

The processor 205 and the sub-processor 231 may be embodied as various means for implementing the various functionalities of example embodiments of the present invention including, for example, microprocessors, coprocessors, controllers, special-purpose integrated circuits such as, for example, ASICs (application specific integrated circuits), FPGAs (field programmable gate arrays), hardware accelerators, processing circuitry, combinations thereof or the like. Processor 205 may have increased processing capabilities over the sub-processor 231 and the processor 205 may consume more power than the sub-processor 231 when both processors are active. According to one example embodiment, processor 205 and/or sub-processor 231 may each be representative of a plurality of processors, or one or more multiple core processors, operating in concert. Further, the processor 205 and/or sub-processor 231 may be comprised of a plurality of transistors, logic gates, a clock (e.g., oscillator), other circuitry, and the like to facilitate performance of the functionality described herein. The processor 205 and/or sub-processor 231 may, but need not, include one or more accompanying digital signal processors. In some example embodiments, the processor 205 and/or sub-processor 231 are configured to execute instructions stored in the memory device 210 and/or memory device 232, respectively, or instructions otherwise accessible to the processor 205 and/or sub-processor 231. The processor 205 and/or the sub-processor 231 may be configured to operate such that the processors cause the apparatus 200 to perform various functionalities described herein.

Whether configured as hardware or via instructions stored on a computer-readable storage medium, or by a combination thereof, the processor 205 and/or the sub-processor 232 may be entities capable of performing operations according to embodiments of the present invention while configured accordingly. Thus, in example embodiments where the processor 205 and/or sub-processor 231 are each embodied as, or are part of, an ASIC, FPGA, or the like, the processor 205 and/or sub-processor 231 are specifically configured hardware for conducting the operations described herein. Alternatively, in example embodiments where processor 205 and/or sub-processor 231 are embodied as executors of instructions stored on a computer-readable storage medium, the instructions specifically configure the processor 205 and/or sub-processor 231 to perform the algorithms and operations described herein. In some example embodiments, the processor 205 and/or sub-processor 231 processors of a specific device (e.g., a mobile terminal) configured for employing example embodiments of the present invention by further configuration of the processor 205 and/or sub-processor 231 via executed instructions for performing the algorithms, methods, and operations described herein.

The memory devices 210 and 232 may each be one or more computer-readable storage media that may include volatile and/or non-volatile memory. In some example embodiments, the memory devices 210 and 232 include Random Access Memory (RAM) including dynamic and/or static RAM, on-chip or off-chip cache memory, and/or the like. Further, memory devices 210 and 232 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory devices 210 and 232 may include a cache area for temporary storage of data. In this regard, some or all of memory devices 210 and 232 may be included within the processor 205 or sub-processor 231.

The I/O interface 206 may be any device, circuitry, or means embodied in hardware, software, or a combination of hardware and software that is configured to interface the processor 205 with other circuitry or devices, such as the communications interface 215 and the sub-system 230. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities.

The communication interface 215 may be any device or means embodied in either hardware, a computer program product, or a combination of hardware and a computer program product that is configured to receive and/or transmit data from/to a network 225 and/or any other device or module in communication with the example apparatus 200. Processor 205 may also be configured to facilitate communications via the communications interface by, for example, controlling hardware included within the communications interface 215. In this regard, the communication interface 215 may include, for example, one or more antennas, a transmitter, a receiver, a transceiver and/or supporting hardware, including, for example, a processor for enabling communications. Via the communication interface 215, the example apparatus 200 may communicate with various other network entities in a device-to-device fashion and/or via indirect communications via a base station, access point, server, gateway, router, or the like.

The communications interface 215 may be configured to provide for communications in accordance with any wired or wireless communication standard. The communications interface 215 may be configured to support communications in multiple antenna environments, such as multiple input multiple output (MIMO) environments. Further, the communications interface 215 may be configured to support orthogonal frequency division multiplexed (OFDM) signaling. In some example embodiments, the communications interface 215 may be configured to communicate in accordance with various techniques, such as, second-generation (2G) wireless communication protocols, IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 215 may also be configured to support communications at the network layer, possibly via Internet Protocol (IP).

The user interface 220 may be in communication with the sub-system 230 to receive user input via the user interface 220 and/or to present output to a user as, for example, audible, visual, mechanical or other output indications. The user interface 220 may include, for example, a keyboard, a mouse, a joystick, a display (e.g., a touch screen display), a microphone, a speaker, or other input/output mechanisms. According to some example embodiments, the user interface 220 may also include or support the operation of touch sensors, pressure sensors, light sensors, proximity sensors, remote controllers, and the like. Further, the processor 205 may, possibly via the sub-system 230, be in communication with user interface circuitry configured to control at least some functions of one or more elements of the user interface. The processor 205 and/or user interface circuitry may be configured to control one or more functions of one or more elements of the user interface through computer program instructions (e.g., software and/or firmware) stored on a memory accessible to the processor 205 (e.g., volatile memory, non-volatile memory, and/or the like). In some example embodiments, the user interface circuitry is configured to facilitate user control of at least some functions of the apparatus 200 through the use of a display and configured to respond to user inputs. The processor 205 may also comprise, or be in communication with, display circuitry configured to display at least a portion of a user interface, the display, and the display circuitry configured to facilitate user control of at least some functions of the apparatus 200.

The sub-system 230 of example apparatus 200 may be any means or device embodied, partially or wholly, in hardware, a computer program product, or a combination of hardware and a computer program product, such as sub-processor 231 implementing stored instructions to configure the example apparatus 200, memory device 231 storing executable program code instructions configured to carry out the functions described herein, or a hardware configured sub-processor 231 that is configured to carry out the functions of the sub-system 230 as described herein.

Figure 5:
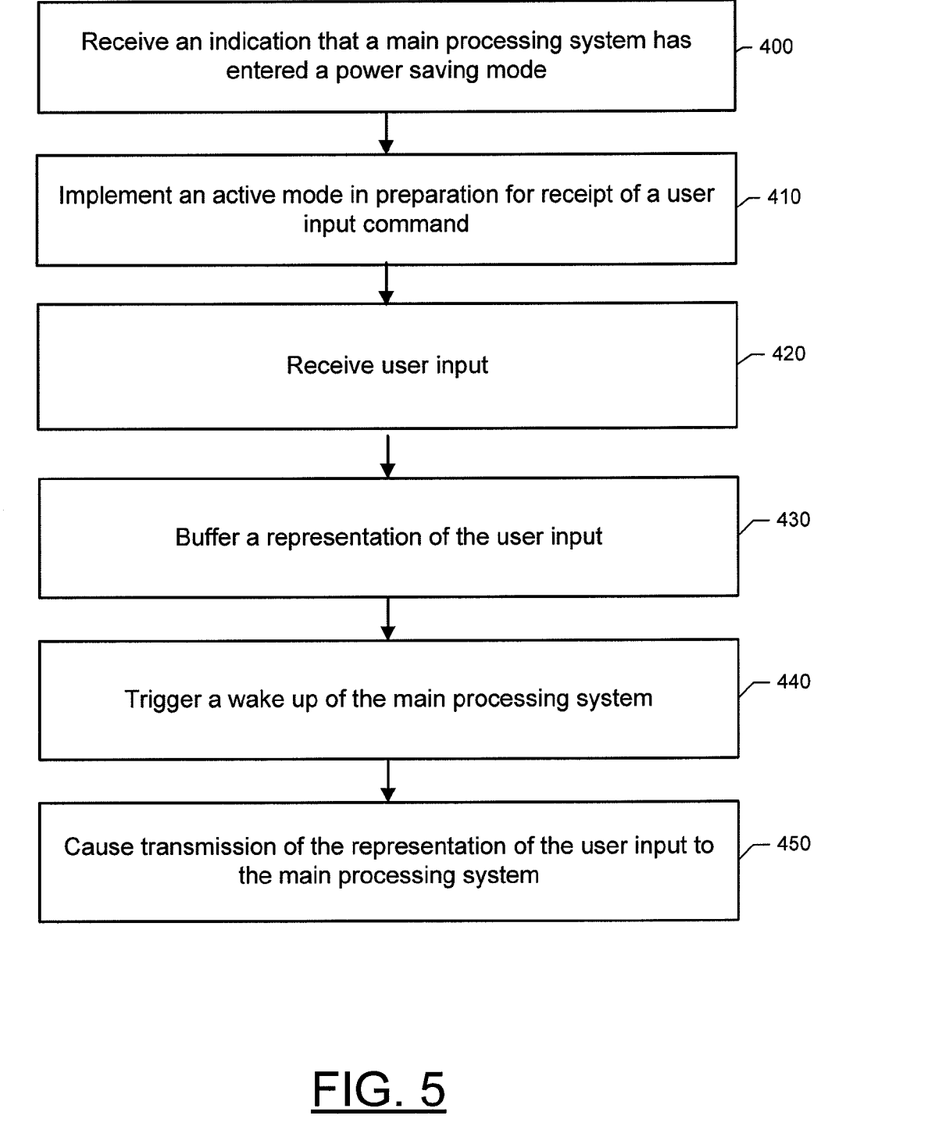
FIG. 5 illustrates a flow chart of a method for performing energy management via a sub-system according to an example embodiment of the present invention.

According to various example embodiments, the sub-system 230 may be configured to perform the functionality described herein and, in particular, the operations described with respect to the example method depicted in FIG. 5. According to some example embodiments, the sub-system 230 may be configured to receive an indication that the main processing system 207 has entered a power saving mode, at 400, and implement an active mode for the sub-system at 410. The sub-system 230 may also be configured to receive a user input, while the main processing system 207 of the electronic device is in a power saving mode at 420 and buffer a representation of the user input at 430. According to some example embodiments, the sub-system 230 may be configured to receive user input is in the form of a user input command. In response to receiving the user input, the sub-system 230 may be configured to trigger a wake up of a main processing system from the power saving mode at 440, and cause transmission of the representation of the user input to the main processing system for processing at 450. According to some example embodiments, the sub-system 230 may be further configured to cause transmission of the representation of the user input, in response to receiving an indication that the main processing system is prepared to receive the representation of the user input for processing. The sub-system 23 may also be configured to, subsequent to causing transmission of the representation of the user input, receive an indication that the main processing system has returned to the power saving mode in response to processing the user input.

Figure 3:
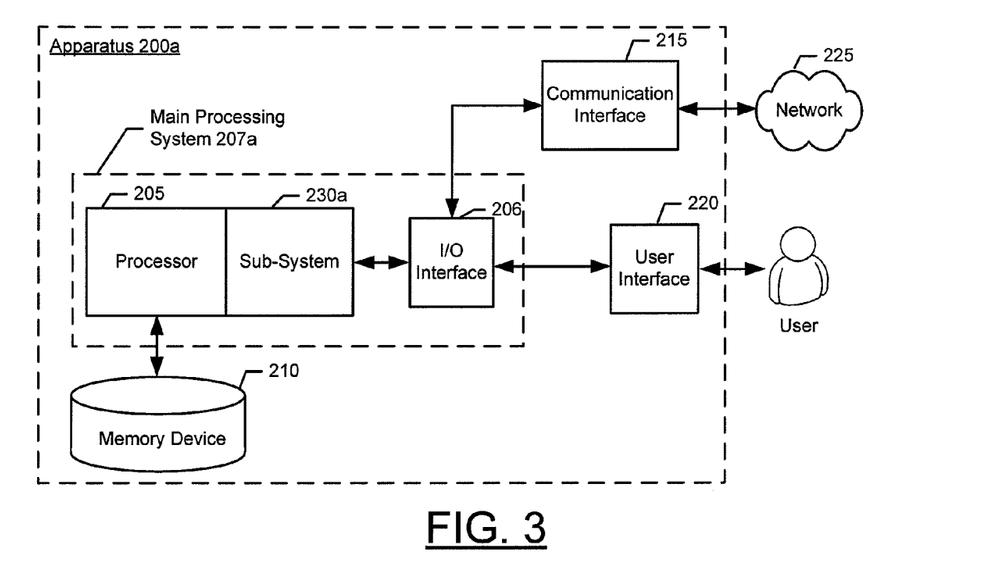
FIG. 3 illustrates another block diagram of an apparatus and associated system for energy management via a subsystem according to an example embodiment of the present invention.

It is noteworthy that the main processing system 207 and the sub-system 230 are illustrated in FIG. 2 as separate entities (e.g., with separate processors). However, according to some example embodiments, such as the example apparatus 200a depicted in FIG. 3, the sub-system 230a may be included in the main processing system 207a, and, in some example embodiments, the sub-system 230a may be part of the processor 205. For example, in some example embodiments, when the main power system 207a enters the power saving mode, the processor 205 may enter a power saving mode where functionality that is not associated with the sub-system 230a is deactivated. Main processing system 207a and sub-system 230 may otherwise be configured to operate similar to main processing system 207 and sub-system 230.

Figure 4:
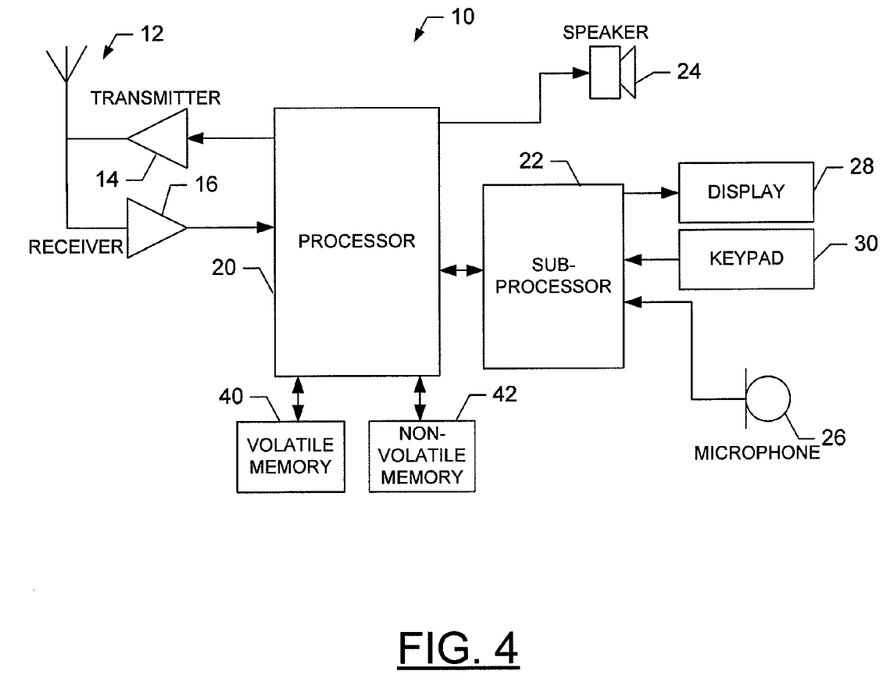
FIG. 4 illustrates a block diagram of an apparatus in the form of a mobile terminal for performing energy management via a sub-processor according to an example embodiment of the present invention.

Referring now to FIG. 4, a more specific example apparatus in accordance with various embodiments of the present invention is provided. The example apparatus of FIG. 4 is a mobile terminal 10 configured to communicate within a wireless network, such as a cellular communications network. The mobile terminal 10 may be configured to perform the functionality described herein. More specifically, the mobile terminal 10 may be caused to perform the functionality described with respect to a sub-system via the sub-processor 22 and the functionality described with respect to the main processing system via the processor 20. In this regard, processor 20 and the sub-processor 22 may be integrated circuits or chips configured similar to the processor 205 and the sub-processor 231. Further, volatile memory 40 and non-volatile memory 42 may configured to support the operation of the processor 20 and the sub-processor 22 as computer readable storage media.

The mobile terminal 10 may also include an antenna 12, a transmitter 14, and a receiver 16, which may be included as parts of a communications interface of the mobile terminal 10. The speaker 24, the microphone 26, the display 28 (which may be a touch screen display), and the keypad 30 may be included as parts of a user interface.

FIGS. 1 and 5 illustrate flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions may be stored on a memory device, such as memory device 210 or 232, of an example apparatus, such as example apparatus 200 or 200*a*, and executed by a processor, such as the processor 205 or the sub-processor 231. As will be appreciated, any such program code instructions may be loaded onto a computer or other programmable apparatus from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

According to another example embodiment, an example method is provided. The example method may include receiving a user input while a main processing system is in a power saving mode, buffering a representation of the user input, and, in response to receiving the user input, triggering, via a processor, a wake up of a main processing system from the power saving mode and causing transmission of the representation of the user input to the main processing system for processing. According to some example embodiments, the example method may further comprise receiving an indication that the main processing system has entered the power saving mode, and, in response to receiving the indication that the main processing system has entered the power saving mode, implementing an active mode in preparation for receipt of user input. According to some example embodiments, receiving user input includes receiving user input, wherein the user input is in the form of a user input command. According to some example embodiments, the example method includes, subsequent to causing transmission of the representation of the user input, receiving an indication that the main processing system has returned to the power saving mode in response to processing the user input. According to some example embodiments, causing transmission of the representation of the user input includes causing transmission of the representation of the user input in response to receiving an indication that the main processing system is prepared to receive the representation of the user input for processing. According to some example embodiments, triggering the wake up of the main processing system includes triggering the wake up of the main processing system from a sub-system, wherein the sub-system and the main processing system are located in separate electronic devices.

Another example embodiment is an apparatus comprising at least one processor and at least one memory including computer program code, the at least one memory and the computer program code configured to, with the at least one processor, cause the apparatus at least to perform receiving a user input while a main processing system is in a power saving mode, buffering a representation of the user input, and, in response to receiving the user input, triggering a wake up of a main processing system from the power saving mode and causing transmission of the representation of the user input to the main processing system for processing. According to some example embodiments, the example apparatus is further caused to perform receiving an indication that the main processing system has entered the power saving mode, and, in response to receiving the indication that the main processing system has entered the power saving mode, implementing an active mode in preparation for receipt of user input. According to some example embodiments, the example apparatus caused to perform receiving user input includes being caused to perform receiving user input, the user input being in the form of a user input command. According to some example embodiments, the example apparatus is further caused to perform, subsequent to causing transmission of the representation of the user input, receiving an indication that the main processing system has returned to the power saving mode in response to processing the user input. According to some example embodiments, the example apparatus caused to perform causing transmission of the representation of the user input includes being caused to perform causing transmission of the representation of the user input in response to receiving an indication that the main processing system is prepared to receive the representation of the user input for processing. According to some example embodiments, the example apparatus caused to perform triggering the wake up of the main processing system includes being caused to perform triggering the wake up of the main processing system from a sub-system, the sub-system and the main processing system being located in separate electronic devices.

According to some example embodiments, the example apparatus comprises a mobile terminal, and wherein the example apparatus further comprises user interface circuitry and user interface software configured to facilitate user control of at least some functions of the mobile terminal through the use of a display and configured to respond to user inputs, and a display and display circuitry configured to display at least a portion of a user interface of the mobile terminal, the display and the display circuitry configured to facilitate user control of at least some functions of mobile terminal. According to some example embodiments, the example apparatus further comprises the main processing system, wherein the main processing system includes a main processor configured to implement the power saving mode.

Another example embodiment is a computer readable storage medium having computer program code stored thereon, the computer program code being configured to, when executed, cause an apparatus to perform receiving a user input while a main processing system is in a power saving mode, buffering a representation of the user input, and, in response to receiving the user input, triggering a wake up of a main processing system from the power saving mode and causing transmission of the representation of the user input to the main processing system for processing. According to some example embodiments, the computer program code is further configured to cause the apparatus to perform receiving an indication that the main processing system has entered the power saving mode, and, in response to receiving the indication that the main processing system has entered the power saving mode, implementing an active mode in preparation for receipt of user input. According to some example embodiments, the computer program code configured to cause the apparatus to perform receiving user input includes being configured to cause the apparatus to perform receiving user input, the user input being in the form of a user input command. According to some example embodiments, the computer program code is further configured to cause the apparatus to perform, subsequent to causing transmission of the representation of the user input, receiving an indication that the main processing system has returned to the power saving mode in response to processing the user input. According to some example embodiments, the computer program code configured to cause the apparatus to perform causing transmission of the representation of the user input includes being configured to cause the apparatus to perform causing transmission of the representation of the user input in response to receiving an indication that the main processing system is prepared to receive the representation of the user input for processing. According to some example embodiments, the computer program code configured to cause the apparatus to perform triggering the wake up of the main processing system includes being configured to cause the apparatus to perform triggering the wake up of the main processing system from a sub-system, the sub-system and the main processing system being located in separate electronic devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
    receiving a user input at a processing system comprising a main processing system and a sub-system while the main processing system is in a power saving mode; wherein the user input is received by the sub-system of the processing system;
    buffering a representation of the user input; and
    in response to receiving the user input:
        triggering, via a processor, a wake up of the main processing system from the power saving mode;
        causing transmission of the representation of the user input to the main processing system for processing; and
        causing the main processing system to return to the power saving mode in response to processing user input.

2. The method of claim 1 further comprising:
    receiving an indication that the main processing system has entered the power saving mode; and
    in response to receiving the indication that the main processing system has entered the power saving mode, implementing an active mode in preparation for receipt of user input.

3. The method of claim 1, wherein receiving user input includes receiving user input, the user input being in the form of a user input command.

4. The method of claim 1 further comprising, subsequent to causing transmission of the representation of the user input, receiving an indication that the main processing system has returned to the power saving mode in response to processing the user input.

5. The method of claim 1, wherein causing transmission of the representation of the user input includes causing transmission of the representation of the user input in response to receiving an indication that the main processing system is prepared to receive the representation of the user input for processing.

6. The method of claim 1, wherein triggering the wake up of the processing system includes triggering the wake up of the main processing system from the sub-system, the sub-system and the main processing system being located in separate electronic devices.

7. An apparatus comprising a processing system; wherein the processing system includes at least one processor and at least one memory including computer program code, the at least one memory and the computer program code configured to, with the at least one processor, cause the apparatus at least to perform:

receiving a user input by a sub-system at a processing system comprising a main processing system and the sub-system while the processing system is in a power saving mode;

buffering a representation of the user input in the sub-system; and in response to the sub-system receiving the user input:
   triggering a wake up of the main processing system by the sub-system from the power saving mode;
   causing transmission of the representation of the user input from the sub-system to the main processing system for processing; and
   causing the main processing system to return to the power saving mode in response to processing the user input.

8. The apparatus of claim 7, wherein the apparatus is further caused to perform:
   receiving an indication at the sub-system that the main processing system has entered the power saving mode; and
   in response to receiving the indication that the main processing system has entered the power saving mode, implementing an active mode on the sub-system in preparation for receipt of user input.

9. The apparatus of claim 7, wherein the apparatus caused to perform receiving user input by the sub-system includes the user input being in the form of a user input command.

10. The apparatus of claim 7 wherein the apparatus is further caused to perform, receiving an indication by the sub-system that the main processing system has returned to the power saving mode in response to processing the user input.

11. The apparatus of claim 7, wherein the transmission of the representation of the user input by the sub-system includes, transmission of the representation of the user input in response to receiving an indication that the main processing system is prepared to receive the representation of the user input for processing.

12. The apparatus of claim 7, wherein the apparatus comprises a mobile terminal; and wherein the apparatus further comprises a user interface configured to facilitate user control of at least some functions of the mobile terminal through the use of a display and configured to respond to user inputs.

13. The apparatus of claim 12, wherein the main processing system includes a processor configured to implement the power saving mode on the processing system.

14. A computer readable storage medium having computer program code stored thereon, the computer program code being configured to, when executed, cause an apparatus to perform:
   receiving a user input at a processing system comprising a main processing system and a sub-system while the main processing system is in a power saving mode; wherein the user input is received by the sub-system of the processing system;
   buffering a representation of the user input; and
   in response to receiving the user input:
      triggering a wake up of the main processing system from the power saving mode;
      causing transmission of the representation of the user input to the main processing system for processing; and
      causing the main processing system to return to the power saving mode in response to processing the user input.

15. The computer readable storage medium of claim 14, wherein the computer program code is further configured to cause the apparatus to perform:
   receiving an indication that the main processing system has entered the power saving mode; and
   in response to receiving the indication that the main processing system has entered the power saving mode, implementing an active mode in preparation for receipt of user input.

16. The computer readable storage medium of claim 14, wherein the computer program code configured to cause the apparatus to perform receiving user input includes being configured to cause the apparatus to perform receiving user input, the user input being in the form of a user input command.

17. The computer readable storage medium of claim 14 wherein the computer program code is further configured to cause the apparatus to perform, subsequent to causing transmission of the representation of the user input, receiving an indication that the main processing system has returned to the power saving mode in response to processing the user input.

18. The computer readable storage medium of claim 14, wherein the computer program code configured to cause the apparatus to perform causing transmission of the representation of the user input includes being configured to cause the apparatus to perform causing transmission of the representation of the user input in response to receiving an indication that the main processing system is prepared to receive the representation of the user input for processing.

19. The computer readable storage medium of claim 14, wherein the computer program code configured to cause the apparatus to perform triggering the wake up of the main processing system includes being configured to cause the apparatus to perform triggering the wake up of the main processing system from the sub-system, the sub-system and the processing system being located in separate electronic devices.

* * * * *

UNITED STATES PATENT AND TRADEMARK OFFICE
CERTIFICATE OF CORRECTION

| | |
|---|---|
| PATENT NO. | : 8,898,500 B2 |
| APPLICATION NO. | : 12/975875 |
| DATED | : November 25, 2014 |
| INVENTOR(S) | : Araki et al. |

It is certified that error appears in the above-identified patent and that said Letters Patent is hereby corrected as shown below:

In the claims:

Column 14,
Lines 34 and 35, "processing user input." should read --processing the user input--.

Signed and Sealed this
Fourth Day of August, 2015

Michelle K. Lee
*Director of the United States Patent and Trademark Office*